United States Patent
Shimoda

(10) Patent No.: US 8,073,598 B2
(45) Date of Patent: Dec. 6, 2011

(54) VEHICULAR DEVICE CONTROL SYSTEM

(75) Inventor: Toshifumi Shimoda, Anjo (JP)

(73) Assignee: Denso Corporation, Kariya (JP)

( * ) Notice: Subject to any disclaimer, the term of this patent is extended or adjusted under 35 U.S.C. 154(b) by 142 days.

(21) Appl. No.: 12/661,495

(22) Filed: Mar. 18, 2010

(65) Prior Publication Data

US 2010/0250072 A1 Sep. 30, 2010

(30) Foreign Application Priority Data

Mar. 26, 2009 (JP) ................................ 2009-075490

(51) Int. Cl.
*G05B 13/02* (2006.01)
*G05B 15/00* (2006.01)

(52) U.S. Cl. ................... 701/49; 701/1; 701/2; 701/36; 701/45

(58) Field of Classification Search ........................ None
See application file for complete search history.

(56) References Cited

U.S. PATENT DOCUMENTS

| | | | | | |
|---|---|---|---|---|---|
| 5,248,007 | A | * | 9/1993 | Watkins et al. | 180/9.32 |
| 5,308,214 | A | * | 5/1994 | Crain et al. | 414/541 |
| 5,373,915 | A | * | 12/1994 | Tremblay | 187/201 |
| 5,746,563 | A | * | 5/1998 | Steckler | 414/462 |
| 6,062,805 | A | * | 5/2000 | Tremblay et al. | 414/540 |
| 6,105,706 | A | * | 8/2000 | Cooper | 180/282 |
| 6,684,969 | B1 | * | 2/2004 | Flowers et al. | 180/65.1 |
| 6,991,060 | B2 | * | 1/2006 | Chernoff et al. | 180/326 |
| 7,594,556 | B1 | * | 9/2009 | Panzarella et al. | 180/169 |

OTHER PUBLICATIONS

Explanation of Toyota "welcab" (2 sheets) with English translation.

* cited by examiner

*Primary Examiner* — Khoi Tran
*Assistant Examiner* — Ian Jen
(74) *Attorney, Agent, or Firm* — Harness, Dickey & Pierce, PLC

(57) ABSTRACT

An in-vehicle device wirelessly sends a request signal to an assistance-possible area in which a user of a welfare-use seat device can be assisted. When a wireless portable key device, i.e., a remote control is present inside of the assistance-possible area, the portable key device returns a response signal containing an ID code. When receiving the response signal, the in-vehicle device executes a collation relative to the ID code contained in the response signal. When the collation is successfully completed, a short-depression movement mode is designated. When a short-time manipulation or depression is once applied to an operation instruction switch of the wireless portable key device under the short-depression movement mode being designated, the movement of a welfare-use seat device is started toward a movement end position without need further continued manipulation or depression to the operation instruction switch.

12 Claims, 11 Drawing Sheets

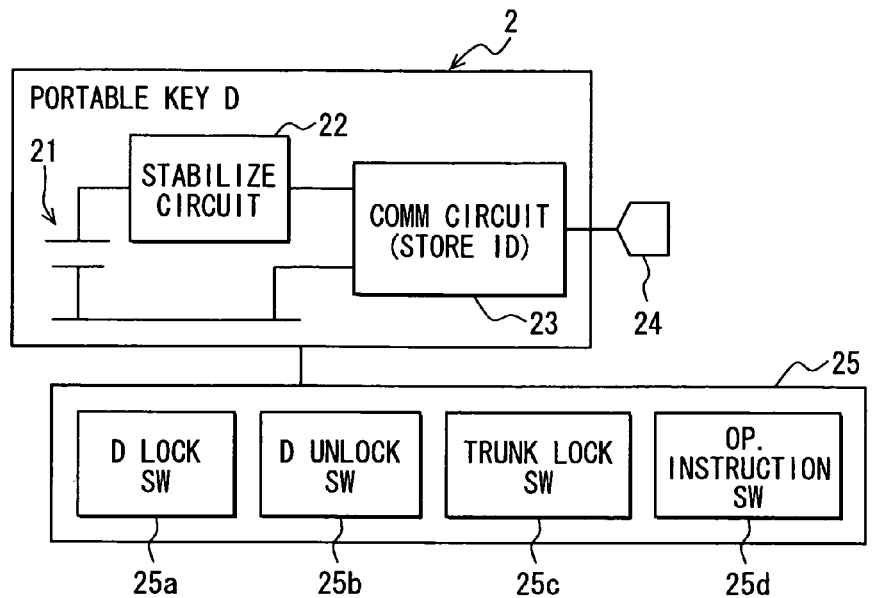
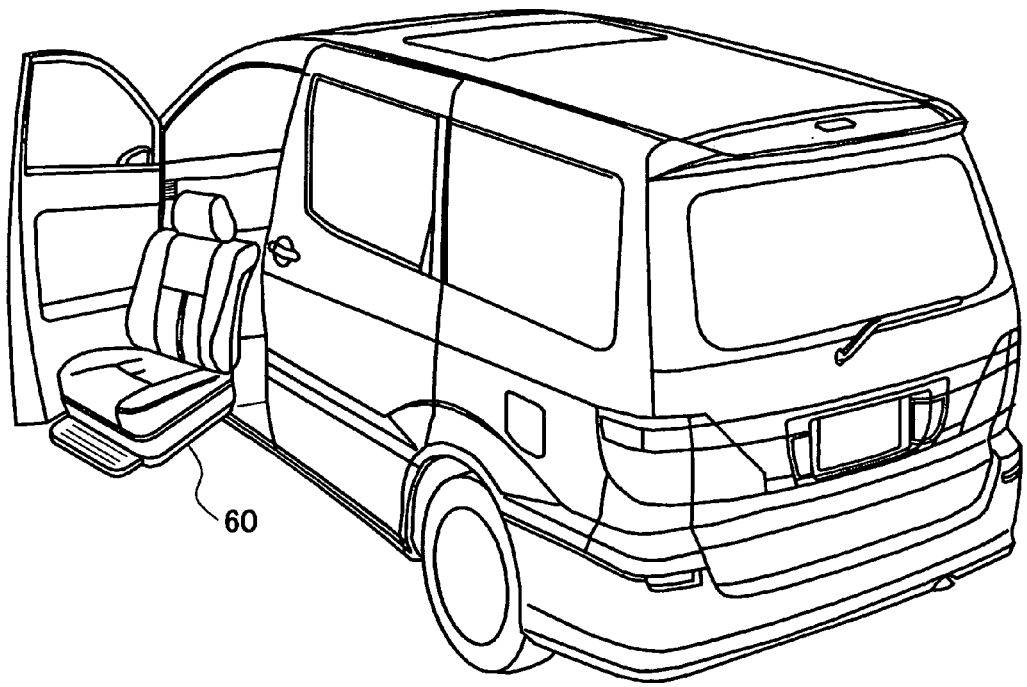

(a) PORTABLE: INST SW
(b) PORTABLE: BATTERY USE
(c) PORTABLE: COMMUNICATE
(d) IN-VEHICLE: TRANSMIT
(e) IN-VEHICLE: RECEIVE
(f) WELFARE SEAT: MOVE MODE
(g) WELFARE SEAT: MOVE

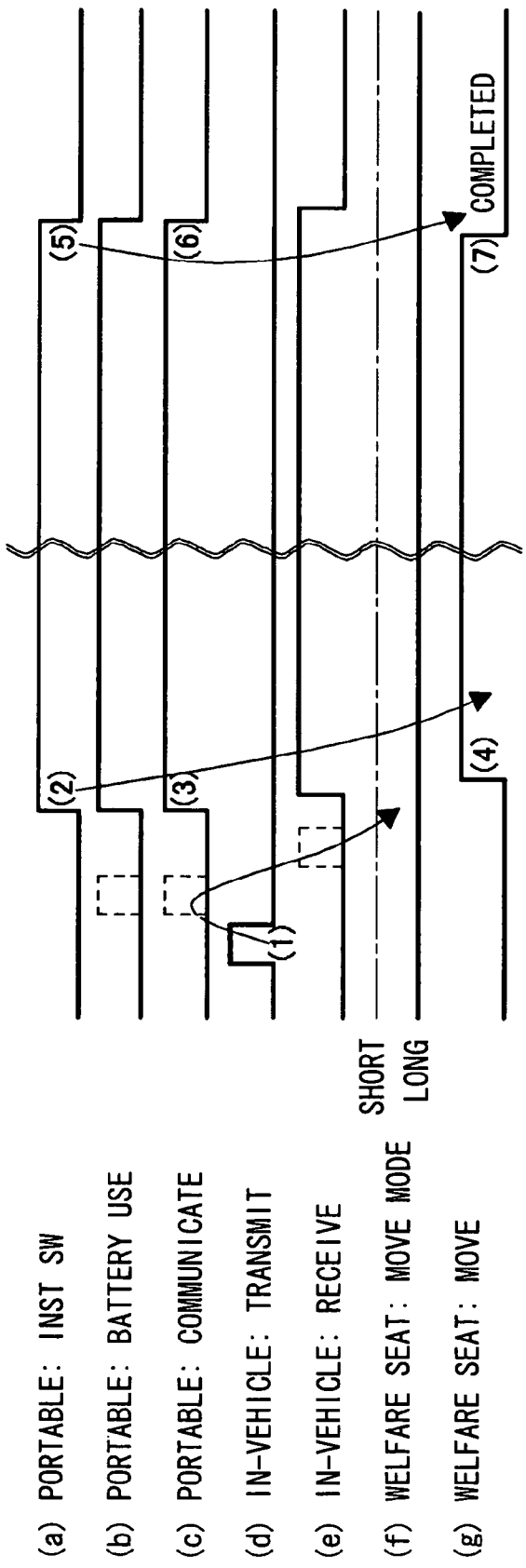

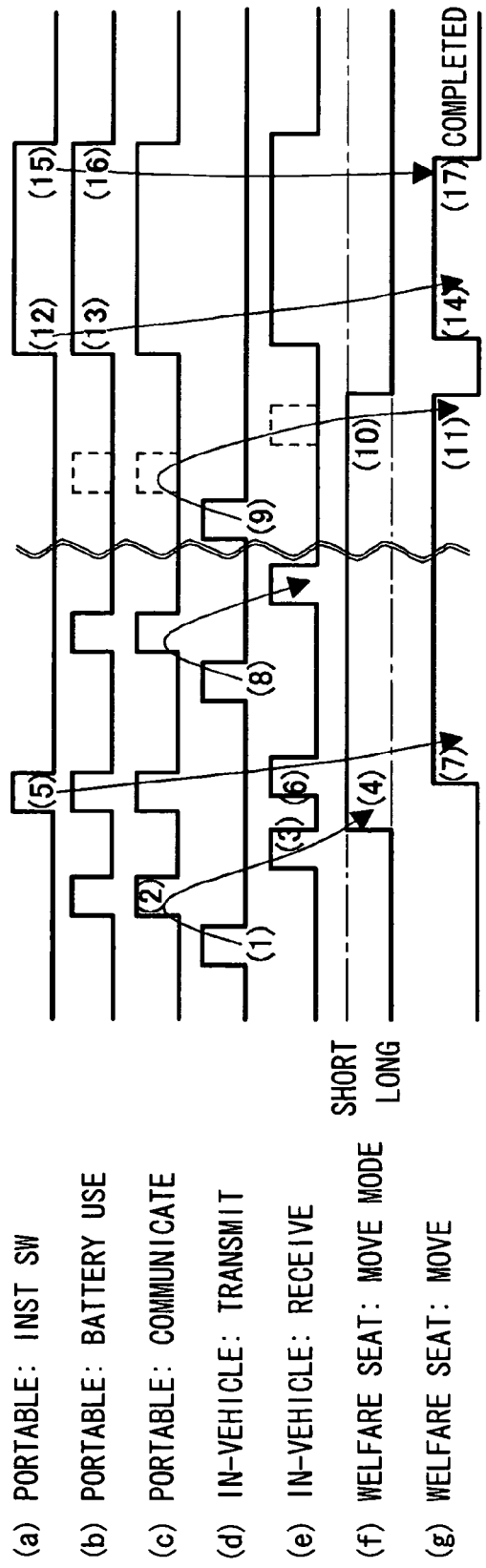

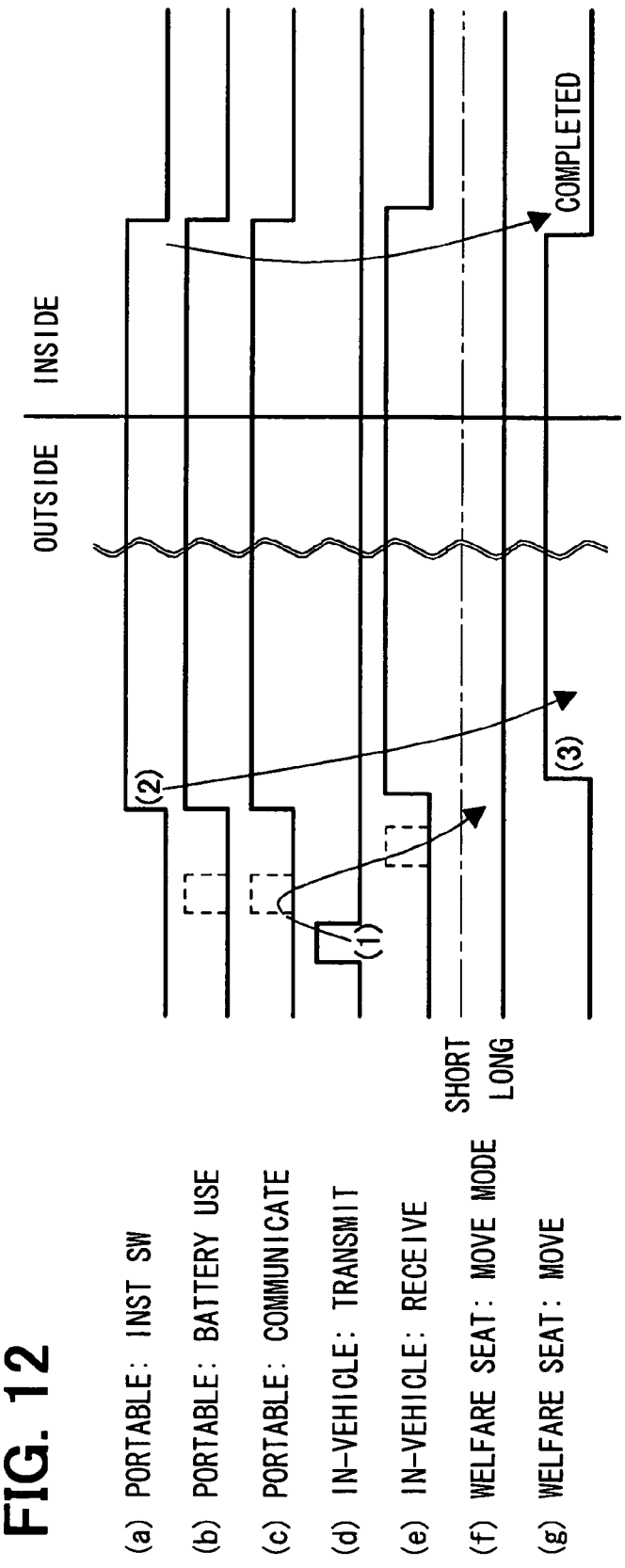

VEHICULAR DEVICE CONTROL SYSTEM

CROSS REFERENCE TO RELATED APPLICATION

The present application is based on and incorporates herein by reference Japanese Patent Application No. 2009-75490 filed on Mar. 26, 2009.

FIELD OF THE INVENTION

The present invention relates to a vehicular device control system which operates remotely or wirelessly a vehicular device provided in a vehicle using a wireless communications device such as a remote control.

BACKGROUND OF THE INVENTION

[Nonpatent document 1] Explanation page of Toyota "welcab" (http://toyota.jp/welcab/alphard/s_liftup/index.html)

There is known a welfare-use vehicle having a welfare-use seat device which executes a bringing-in and bringing-out movement for a user such as an aged person and a disabled person to allow the user to move inward and outward of the vehicle easily (for example, refer to Nonpatent document 1). In order to improve usability in the welfare-use vehicle in Nonpatent document 1, operation of moving inward and outward of the welfare-use seat device can be operated remotely using a remote control. Upon receiving an instruction from the remote control, the welfare-use seat device performs a rotary operation, slide operation, moving-up operation, moving-down operation, etc., to thereby reach a movement end position.

Incidentally, in the conventional welfare-use vehicle, only while the remote control is manipulated, i.e., during the manipulation being continued, the welfare-use seat device is operated. This is to pay attention to safety. For example, even if the remote control hits something to thereby be mistakenly manipulated for a short time, the operation of the welfare seat device is thereby prevented from continuing for a long time; thus, the continuation of the operation is limited only for such a short time under the manipulation being actually applied. That is, the safety aspect is much considered in the conventional welfare-use vehicle; thus, the welfare-use seat device is operated only during a period for which the positive intention of operating the welfare-use seat device is exhibited or demonstrated.

Thus, in the conventional welfare-use vehicle, when actually moving the welfare-use seat device up to the movement end position, the user needs to manipulate the remote control for a long time. The manipulation of the remote control may be felt as a burden. In addition, the battery life of the remote control is naturally thus reduced.

SUMMARY OF THE INVENTION

The present invention is made in view of the above issue. It is an object to provide a vehicular device control system, which remotely operates a vehicular device provided in a vehicle using a portable device as a wireless communications device while improving operability with safety maintained and helping prevent deterioration of the battery life of the wireless communications device such as a remote control.

To achieve the above object, according to an example of the present invention, a vehicular device control system is provided as follows. A vehicular device is provided in a vehicle. A portable device carried by a user of the vehicle is provided while having a function of wireless intercommunication. An in-vehicle device is provided in the vehicle and configured to execute the wireless intercommunication with the portable device. The portable device is further configured to comprise an operation instruction switch which issues, by the wireless intercommunication, to the in-vehicle device an operation instruction of operating the vehicular device. The in-vehicle device is further configured to comprise (i) a determination section to determine, by the wireless intercommunication with the portable device, whether the portable device exists in an assistance-possible area, which is in a vicinity of the vehicular device, the assistance-possible area in which a user of the vehicular device is able to assisted; (ii) a movement mode designation section to designate a short-manipulation movement mode when it is determined that the portable device exists in the assistance-possible area; and (iii) an execution section to execute a movement of the vehicular device such that while the short-manipulation movement mode continues to be designated by the movement mode designation section, the vehicular device is moved up to a movement end position by a short-time manipulation, which is applied to the operation instruction switch.

In the vehicular device control system provided with the vehicular device, portable device, and in-vehicle device, the portable device functions as a remote control, and has the operation instruction switch which carries out transmission of the operation instruction of the vehicular device wirelessly to the in-vehicle device. In addition, the determination section, which may be included in a control circuit, of the in-vehicle device determines whether the portable device exists in the assistance-possible area near the vehicular device, wherein in the assistance-possible area the user of the vehicular device can be assisted. The movement mode designation section designates the short-manipulation (i.e., short-depression) movement mode when it is determined that the portable device exists in the assistance-possible area. The execution section causes the vehicular device to move to the movement end position based on a short-time manipulation to the operation instruction switch when the short-manipulation movement mode is designated.

The vehicular device can be thus operated or moved only by the short-time manipulation applied to the operation instruction switch. Therefore, the user's manipulation load can be reduced, while the consumption or deterioration of the battery life of the remote control can be reduced. In such a case, when the portable device is determined to exist in the assistance-possible area, it is considered that the user who carries the portable device is also in the assistance-possible area. Therefore, even if a failure occurs in course of the movement of the vehicular device, the user of the portable device can assist the user of the vehicular device, for instance, by urgently stopping the movement of the vehicular device or supporting the user of the vehicular device, thus maintaining the safety.

As another example of the present invention, a vehicular welfare-use device control system is provided as follows. A welfare-use device is provided in a vehicle. An in-vehicle device is provided in the vehicle and configured to control the welfare-use device. The in-vehicle device has a function of wireless intercommunication. A portable device carried by a user of the vehicle is provided and configured to execute the wireless intercommunication with the in-vehicle device. The portable device comprises an operation instruction switch which issues, via the wireless intercommunication, to the in-vehicle device an operation instruction of operating the welfare-use device. The in-vehicle device is further configured to comprise: (i) a determination section to determine, using the wireless intercommunication with the portable device, whether the portable device exists in an assistance-possible area, which is in a vicinity of the welfare-use device, the assistance-possible area in which a user of the welfare-use device is able to be assisted by the user carrying the portable device; (ii) a movement mode designation section to designate a short-manipulation movement mode when it is determined that the portable device exists in the assistance-possible area; and (iii) an execution section to execute a movement of the welfare-use device such that the movement of the welfare-use device is started by a trigger signal corresponding to a short-time manipulation, which is applied to the operation instruction switch of the portable device under the short-manipulation movement mode being designated, and such that the movement of the welfare-use device is continued until reaching a movement end position as long as the movement mode designation section subsequently continues to designate the short-manipulation movement mode.

As yet another example of the present invention, a method is provided for moving a vehicular service device in a vehicular service device control system. The system includes: an in-vehicle device provided in the vehicle and configured to control the vehicular service device while having a function of wireless intercommunication; and a portable device carried by a user of the vehicle and configured to execute the wireless intercommunication with the in-vehicle device. The portable device comprises an operation instruction switch which issues, via the wireless intercommunication, to the in-vehicle device an operation instruction of operating the vehicular service device. The method comprises: (i) determining, using the wireless intercommunication with the portable device, whether the portable device exists in an assistance-possible area, which is in a vicinity of the vehicular service device, the assistance-possible area in which a user of the vehicular service device is able to be assisted by the user carrying the portable device; (ii) designating a short-manipulation movement mode when it is determined that the portable device exists in the assistance-possible area; (iii) determining whether, under the short-manipulation movement mode, a short-time manipulation is applied to the operation instruction switch of the portable device; (iv) starting, when it is determined that the short-time manipulation is applied to, the operation instruction switch under the short-manipulation movement mode, a movement of the vehicular service device toward a movement end position; and (v) then continuing the movement of the vehicular service device until reaching the movement end position as long as the short-manipulation movement mode continues being designated.

BRIEF DESCRIPTION OF THE DRAWINGS

The above and other objects, features, and advantages of the present invention will become more apparent from the following detailed description made with reference to the accompanying drawings. In the drawings:

FIG. 2 is a block diagram illustrating an overall configuration of a wireless portable key device;

FIG. 4 is a view for explaining an installation position and movement in a welfare-use seat device in a vehicle;

FIG. 10 is a diagram for illustrating a timing chart of signals in "long-depression movement mode";

FIG. 11 is a diagram for illustrating a timing chart of signals when a wireless portable key device is moved into an outside of an assistance-possible area; and FIG. 12 is a diagram for illustrating a timing chart of signals when a wireless portable key device is moved into an inside of an assistance-possible range.

DETAILED DESCRIPTION OF THE PREFERRED EMBODIMENTS

Figure 1:
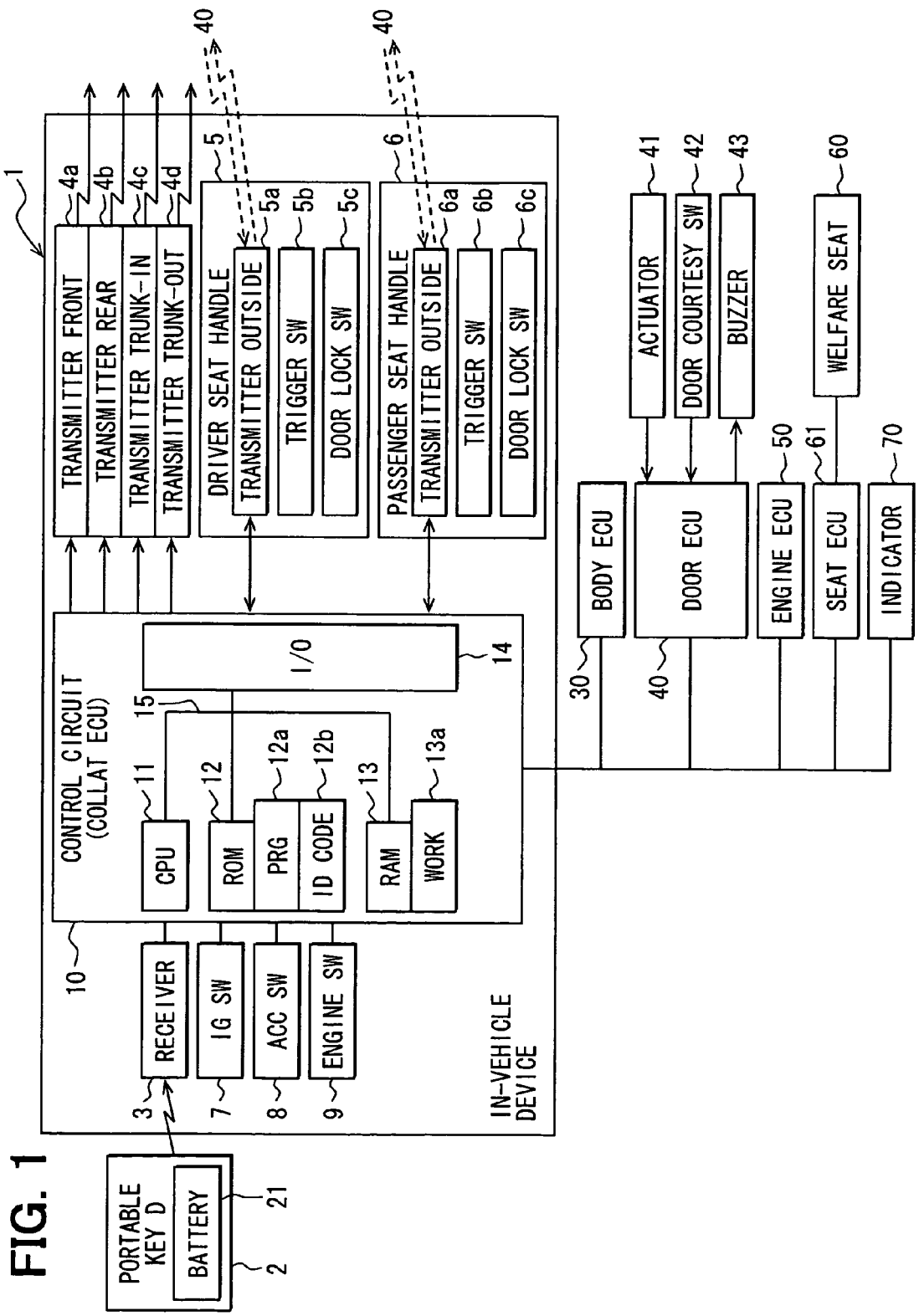
FIG. 1 is a block diagram of an overall configuration of a vehicular device control system according to an embodiment of the present invention.

Hereinafter, an embodiment of the present invention is described with reference to the drawings. FIG. 1 is a block diagram of an overall configuration of a vehicular device control system according to an embodiment of the present invention. The vehicular device control system according to the present embodiment may be also referred to as a vehicular device control apparatus, a welfare-use device control system, or a vehicular service device control system. The vehicular device control system includes the following: an in-vehicle device 1 (also referred to as an in-vehicle communications device) which receives a wireless signal from a wireless portable key device 2 (also referred to as a portable device or a portable communications device); a body ECU 30 connected to the in-vehicle device 1 via a multiplex communications link; each door. ECU 40; an engine ECU 50; a seat control ECU 61; and an indicator 70 (also referred to as an indication device).

The vehicular device control system may be called a smart key system. The in-vehicle device 1 and the wireless portable key device 2 execute two way or inter-connected communications (i.e., intercommunication). The in-vehicle device 1 determines whether the wireless portable key device 2 exists in the vehicle compartment or in the vicinity of the vehicle. Depending on whether the wireless portable key device 2 exists in the vehicle compartment or in the vicinity of the vehicle, an entry function to unlock or lock a vehicle door, or a start function to start the engine is achieved.

The in-vehicle device 1 includes the following: a receiver 3, an ignition switch (IG SW) 7, an accessories switch (ACC SW) 8, an engine switch (SW) 9, a control circuit (also referred to as a collation ECU) 10, various transmitters 4a to 4d, a door handle 5 outside of a driver seat door (also referred to as a driver seat-outside door handle 5), and a door handle 6 outside of a passenger seat door (also referred to a passenger seat-outside door handle 6).

The collation ECU 10 or the control circuit 10 is configured as a usual computer to include a CPU 11, ROM 12, RAM 13, an input and output device (I/O) 14, and a bus line 15 connecting the foregoing. The ROM 12 stores a control program 12a and an ID code 12b; the RAM 12 contains a work memory 13a. The CPU11 reads the control program 12a of the ROM 12, and executes various data processing in a manner to use the work memory 13a of the RAM 13 as a workspace. For example, depending on the position of the wireless portable key device 2, a movement mode designation process or movement process for each movement mode is executed. The movement mode designation process is to designate a movement mode of a welfare-use seat device 60 (also referred to as a vehicular device or a vehicular service device) connected to the seat control ECU 61. The movement process is to move the welfare-use seat device 60 according to the designated movement mode. Those processes are characteristic portions of the present embodiment, and will be explained later with reference to a flowchart.

The collation ECU 10 or the control circuit 10 is connected with the following: transmitters 4a and 4b inside of a vehicle compartment (also referred to an a vehicle compartment transmitters 4a and 4b), a transmitter 4c inside a trunk (also referred to as a trunk-inside transmitter 4c), a transmitter 4d outside the trunk (also referred to as a trunk-outside transmitter 4d), a transmitter 5a outside the vehicle compartment adjacent to a driver seat (also referred to as a vehicle-outside driver seat transmitter 5a), and a transmitter 6a outside the vehicle compartment adjacent to a passenger seat (also referred to as a vehicle-outside passenger seat transmitter 6a). Further, the IG SW 7, the ACC SW 8, the engine SW 9, etc., are connected. Furthermore, the receiver 3, IG SW 7, ACC SW 8, and engine SW 9 are connected to the input and output device (I/O) 14 of the collation ECU 10.

The vehicle-outside driver seat transmitter 5a is built in the outside door handle 5 of the driver seat door (refer to FIG. 1). The outside door handle 5 is provided with not only the vehicle-outside driver seat transmitter 5a, but also a driver seat trigger SW 5b (e.g., touch sensor) and a driver seat door lock SW 5c (e.g., push button switch). The driver seat trigger SW 5b outputs a signal indispensable when the entry function unlocks the driver seat door (or all the doors) in the locked position. The driver seat door lock SW 5c outputs a signal indispensable when the entry function locks the driver seat door (or all the doors) in the unlocked position.

Similarly, the vehicle-outside passenger seat transmitter 6a is built in the outside door handle 6 of the passenger seat door (refer to FIG. 1). The outside door handle 6 is provided with not only the vehicle-outside passenger seat transmitter 6a, but also a passenger seat trigger SW 6b (e.g., touch sensor) and a passenger seat door lock SW 6c (e.g., push button switch). The passenger seat trigger SW 6b outputs a signal indispensable when the entry function unlocks the passenger seat door (or all the doors) in the locked position. The passenger seat door lock SW 6c outputs a signal indispensable when the entry function locks the passenger seat door (or all the doors) in the unlocked position. Furthermore, a trigger SW and a door lock SW may be further provided in the outside door handle of each rear seat.

Each door ECU 40 is connected with an actuator 41 for locking or unlocking a door and a door courtesy SW 42 for detecting opening-closing of a door. In addition, the driver seat door ECU 40 is connected with a buzzer 43 for sounding alarm for a user. Furthermore, each door is provided with a vehicle-inside door lock handle or knob (unshown) in the proximity of the vehicle-inside door handle for locking or unlocking each door by manual operation. In addition, the driver seat door and the passenger seat door are provided with key cylinders (unshown) for locking or unlocking the driver seat door and the passenger seat door selectively (or collectively) near the vehicle-outside door handles by manual operation which uses a mechanical key device from the outside of the vehicle, respectively. Furthermore, when a lock operation is executed using the vehicle compartment door lock handle or the key cylinder, the lock position SW ON signal is outputted to the corresponding door ECU 40 from the lock position SW (unshown).

Figure 5:
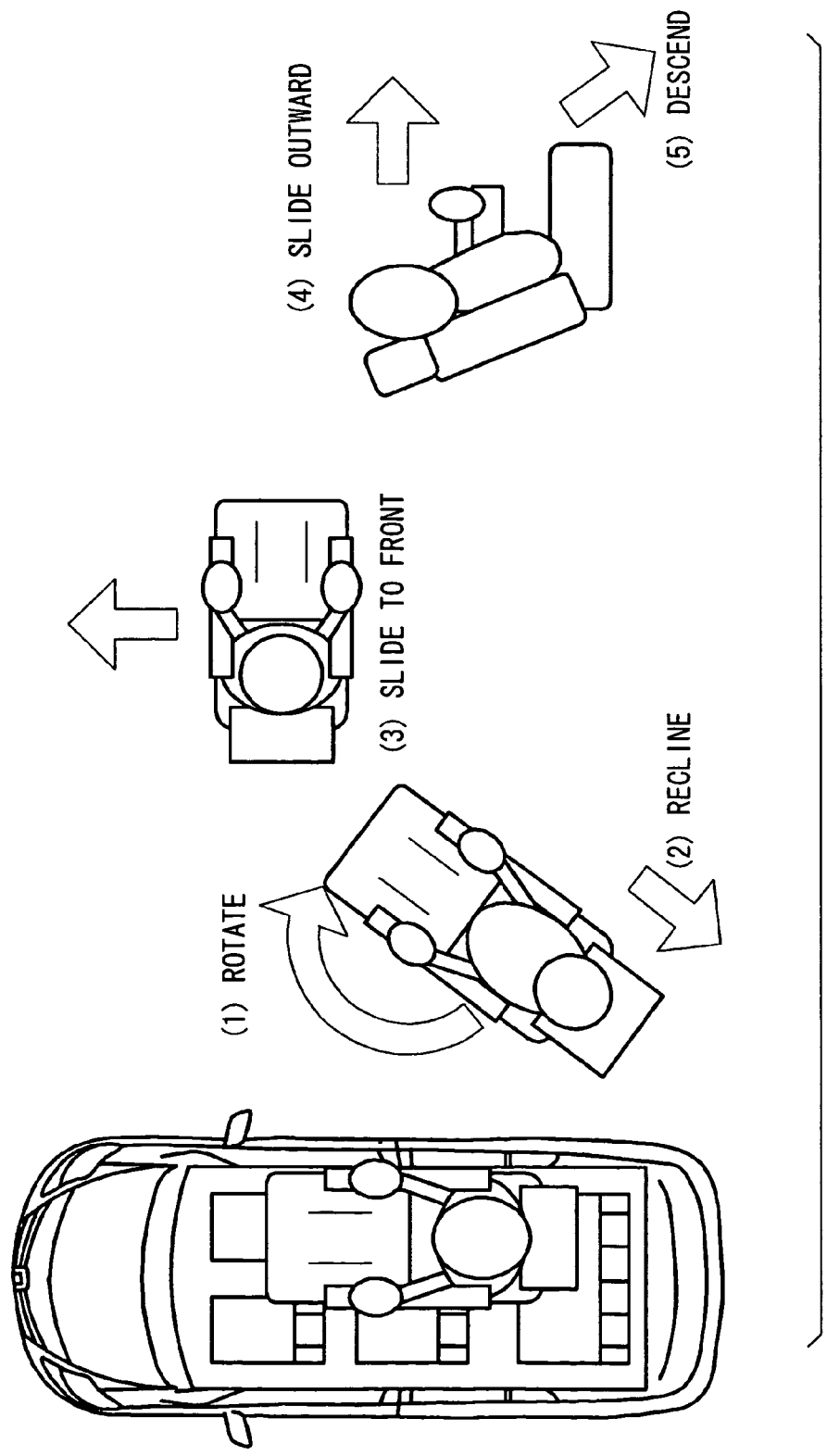
FIG. 5 is a view for explaining an installation position and movement in a welfare-use seat device in a vehicle.

In addition, the collation ECU 10 of the in-vehicle device 1 is connected with the seat control ECU 61 and the indicator 70 such as a speaker. The seat control ECU 61 is connected with the welfare-use seat device 60 for controlling movement of the welfare-use seat device 60. The welfare-use seat device 60 performs the movement inward and outward of the vehicle based on the signal from the seat control ECU 61, in order to allow a user such as an aged person and a disabled person to easily move inward and outward of the vehicle, i.e., execute a bringing-in and bringing-out movement of the user of the welfare-use seat device 60 with respect to the vehicle compartment. FIGS. 4, 5 are views for explaining an installation position and movement in the welfare-use seat device 60 in the vehicle. As indicated in FIG. 4, the welfare-use seat device 60 carries out the movement inward and outward with respect to the passenger seat inside the vehicle compartment. That is, the welfare-use seat device 60 carries out a bringing-out movement for bring out a user to an outside of the vehicle or vehicle compartment, or carries out a bringing-in movement for bringing the user into the vehicle compartment. Furthermore, the welfare-use seat device 60 is located in a rear portion of the vehicle compartment when it is finally stored at the movement end position inside the vehicle compartment.

Thus, in the present embodiment indicated in FIG. 4, the movement inward and outward of the welfare-use seat device 60 is made with respect to the passenger seat or passenger seat door. In this regard, however, the movement inward and outward of the welfare-use seat device 60 may be made with respect to any other seat or door, e.g., rear seat door, or a rear door (i.e., a hatchback if present). Furthermore, the movement end position of the welfare-use seat device 60 may be not only at a rear portion of the vehicle compartment, but also at any portion of the vehicle compartment, depending on a design of the vehicle or a usage of the welfare-use seat device 60.

In the bringing-out movement, as indicated in FIG. 5, the welfare-use seat device 60 is finally arranged at the movement end position posterior to several types of movements as follows: (1) a rotary movement to rotate to face a side face of the vehicle; (2) a reclining movement to return the reclined position to the reference position; (3) a forward slide movement to slide to a front portion of the vehicle compartment; (4) an outward slide movement to slide to an outside of the vehicle; and (5) a downward movement to descend toward near the ground surface. In contrast, in the bringing-in movement, the respective movements (1) to (5) in the bringing-out movement are performed in the reverse order to thereby move the welfare-use seat device 60 to the movement end position.

FIG. 2 is a block diagram illustrating an overall configuration of the wireless portable key device 2. The wireless portable key device 2 includes a battery 21, a stabilization circuit 22, a communications circuit 23, and an antenna 24 as indicated in FIG. 2. The communications circuit 23 stores an ID code unique to the vehicle. The wireless portable key device 2 is configured to respond to a request signal by returning a response signal containing the ID code. In addition, the wireless portable key device 2 is provided with a wireless switch 25. The wireless switch 25 includes, for instance, several push button type switches such as a door lock switch 25a, a door unlock switch 25b, a trunk unlock switch 25c, and an operation instruction switch 25d to issue an operation instruction of operating the welfare-use seat device 60. The operation signals of respective switches 25a, 25b, 25c, and 25d are inputted to the communications circuit 23 through the switch circuit (unshown) and the microcomputer.

Figure 3:
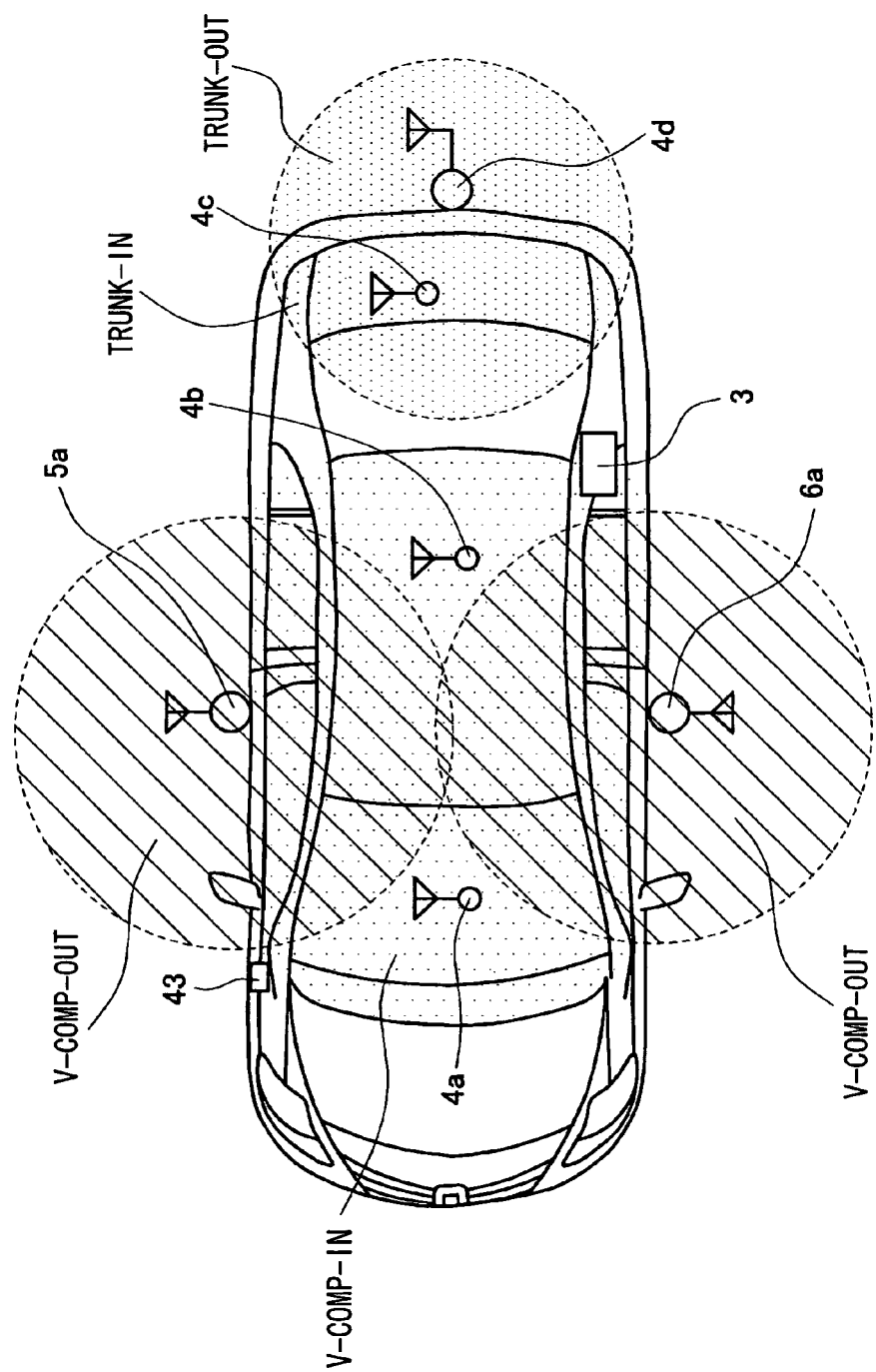
FIG. 3 is a view illustrating attachment positions of transmitters in a vehicle.

FIG. 3 is a view illustrating attachment positions of transmitters in the vehicle. As mentioned above, the vehicle-outside driver seat transmitter 5a is provided at the driver seat door; the vehicle-outside passenger seat transmitter 6a is provided at the passenger seat door. In addition, the vehicle-inside transmitters 4a and 4b are provided in a front position and a rear position inside of the vehicle compartment. The trunk-inside transmitter 4c and trunk-outside transmitter 4d are provided in the trunk of the vehicle.

The transmitters 4a to 4d, 5a, and 6a send request signals for confirming the existence or nonexistence of the wireless portable key device 2 based on instructions of the collation ECU 10. The vehicle-inside transmitters 4a and 4b can cover all the area within the vehicle compartment; request signals are thus transmitted to all the area within the vehicle compartment. The trunk-inside transmitter 4c can cover all the area within the trunk; a request signal is thus transmitted to all the area within the trunk. In addition, the trunk-outside transmitter 4d can cover an area of 0.7 m to 1.0 m centering on the trunk outside of the vehicle; a request signal is thus transmitted to that area outside of the vehicle. In addition, the vehicle-outside driver seat transmitter 5a can cover an area of 0.7 m to 1.0 m centering on the driver seat outside of the vehicle; a request signal is thus transmitted to that area outside of the vehicle. In addition, the vehicle-outside passenger seat transmitter 6a can cover an area of 0.7 m to 1.0 m centering on the passenger seat outside of the vehicle; a request signal is thus transmitted to that area outside of the vehicle. Thus, the request signals are sent to the vehicle compartment or the vicinity outside of the vehicle.

Incidentally, when the safety aspect is considered in the bringing-in or bringing-out movement of the welfare-use seat device 60, it is desirable for an assistant to attend in an area near the welfare-use seat device 60 so as to assist a user of the welfare-use seat device 60 near the welfare-use seat device 60. When a failure or trouble occurs in course of movement of the welfare-use seat device 60, the attending assistant can cope with the failure, for instance, by urgently stopping the movement of the welfare-use seat device 60, or supporting the user of the welfare-use seat device 60. As mentioned above, the welfare-use seat device 60 is moved inward and outward with respect to the passenger seat door. Therefore, in the present embodiment, an area where an assistance is possible (referred to as an assistance-possible area) is designated in a request signal transmission area of the vehicle-outside passenger seat transmitter 6a (i.e., an area of 0.7 m to 1.0 m centering on the passenger seat door). The assistance-possible area is used in the movement mode designation process, which is mentioned later.

In the vehicular device control system in the present embodiment, the in-vehicle device 1 sends request signals from the transmitters 4a to 4d, 5a, and 6a. The wireless portable key device 2 responds to the request signal by returning a response signal containing an ID code. When receiving the response signal, the in-vehicle device 1 determines whether the wireless portable key device 2 exists in the vehicle compartment or in the vicinity of the vehicle, based on the ID code contained in the response signal.

In the vehicular device control system, in the condition that (i) a user is outside the vehicle and (ii) all the doors are in the locked states, the door unlocking process is executed. Specifically, when it is determined that the wireless portable key device 2 exists in a vicinity outside of the vehicle, the driver seat door and the passenger seat door are switched into the door unlocking standby state. Under the door unlocking standby state, when the driver seat-outside door handle 5 or the passenger seat-outside door handle 6 is touched, the door corresponding to the touched door handle 5 or 6 is unlocked.

In addition, in the vehicular device control system of the present embodiment, in the condition that (i) the engine SW 9 is in the OFF state and (ii) all the doors are in the closed states (each door courtesy SW 42 is in the OFF state), the door lock process is executed. Specifically, when, for instance, the driver seat door lock SW 5c is turned into the ON state by a user, it is determined whether the wireless portable key device 2 is not in the vehicle compartment, but in the vicinity outside of the vehicle. When it is determined that the wireless portable key device 2 is present in the vicinity outside of the vehicle, the driver seat door (or all the doors) is turned into the locked state.

In addition, in the vehicular device control system of the present embodiment, in the condition that (i) the user gets on the vehicle compartment, and (ii) all the doors are in the closed state (each door courtesy SW 42 is in the OFF state), the engine start process is executed. Specifically, when it is determined that the wireless portable key device 2 exists in the vehicle compartment, the engine is started based on the ON signal from the engine SW 9.

Thus, the vehicular device control system executes the door unlocking process, door locking process, and the engine start process as a so-called smart key system. In addition, in the vehicular device control system of the present embodiment, the movement mode designation process is performed which designates the movement mode of the welfare-Use seat device 60 according to the position of the wireless portable key device 2. The movement mode includes a "short-depression movement mode" and a "long-depression movement mode." The "short-depression movement mode" is a movement mode in which the welfare-use seat device 60 is moved to the movement end position by (based on) a short-time manipulation to the operation instruction, switch 25d of the wireless portable key device 2. In other words, in the "short-depression movement mode," a short-time manipulation or depression against the operation instruction switch 25d of the wireless portable key device 2 can become a trigger instruction signal which starts and executes the movement of the welfare-use seat device 60 up to the movement end position. In addition, the "short-depression movement mode" is a movement mode in which the movement of the welfare-use seat device 60 is stopped when the operation instruction switch 25d is re-manipulated in course of (or during) the movement of the welfare-use seat device 60 before reaching the movement end position. The short-depression movement mode may be referred to as a short-manipulation movement mode.

In contrast, the "long-depression movement mode" is a movement mode in which the welfare-use seat device 60 is operated only while the operation instruction switch 25d is being actually manipulated, i.e., only under the manipulation or depression being continued against the operation instruction switch 25d. The long-depression movement mode may be referred to as a long-manipulation movement mode.

Figure 6:
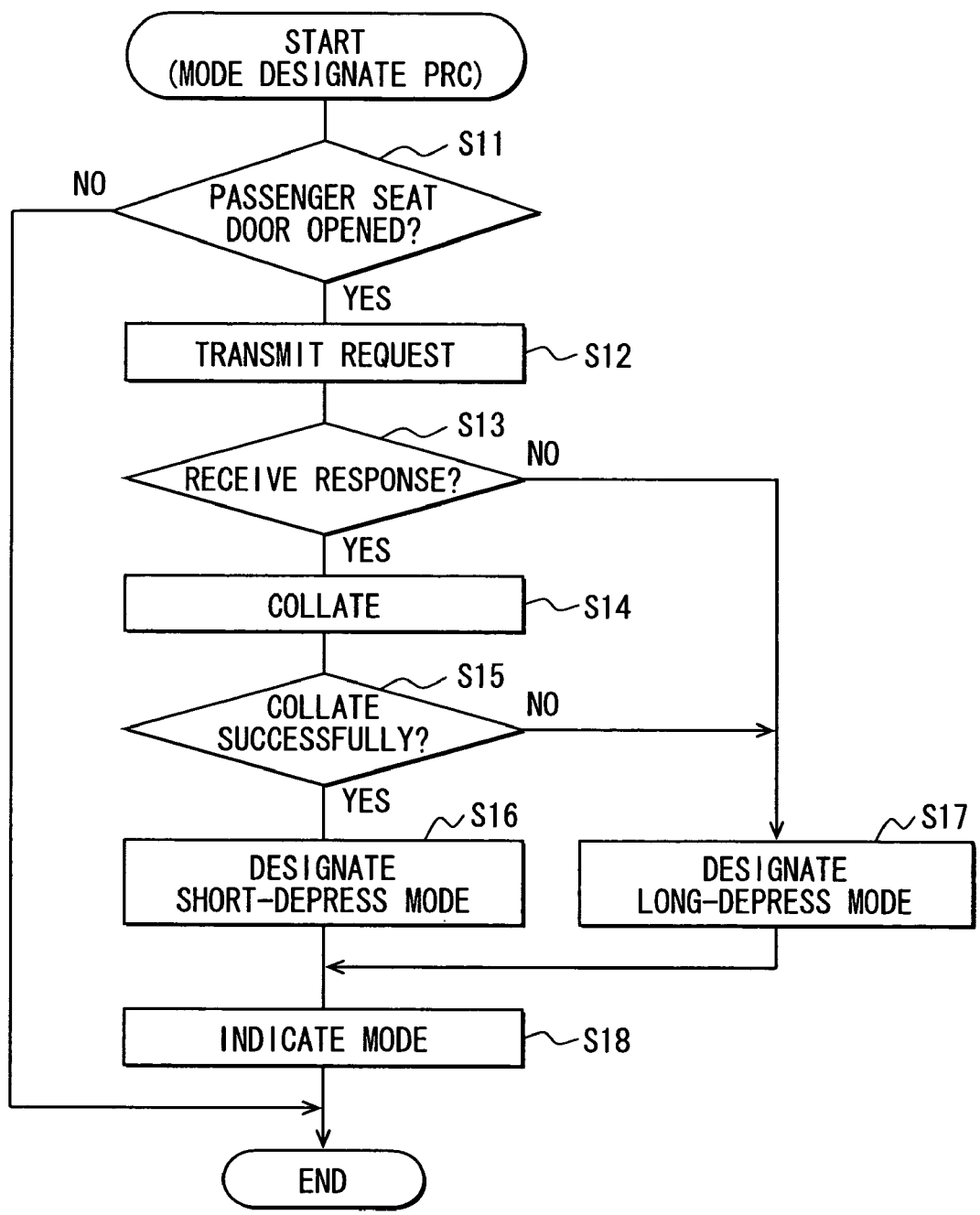
FIG. 6 is a flowchart illustrating a movement mode designation process.

Next, the movement mode designation process is explained with reference to a flowchart. FIG. 6 is a flowchart which illustrates a movement mode designation process which the collation ECU 10 (i.e., the control circuit 10) executes. Furthermore, the movement mode designation process of FIG. 6 is executed with predetermined fixed intervals. It is further noted that a flowchart or the processing of the flowchart in the present application includes sections (also referred to as steps), which are represented, for instance, as S11. Further, each section can be divided into several sub-sections while several sections can be combined into a single section. Furthermore, each of thus configured sections can be referred to as a means or unit and achieved not only as a software device but also as a hardware device.

At S11, it is determined whether the passenger seat door is opened by communicating with the passenger seat door ECU

40. When it is determined that the passenger seat door is not opened (S11: NO), the movement mode designation process is ended as it is. In contrast, when it is determined that the passenger seat door is opened (S11: YES), the processing proceeds to S12.

At S12, a request signal is transmitted from the vehicle-outside passenger seat transmitter 6*a*. In this case, the request signal is transmitted to the assistance-possible area of 0.7 m to 1.0 m where the user of the welfare-use seat device 60 can be assisted. When the user who carries the wireless portable key device 2 is within the assistance-possible area, the wireless portable key device 2 responds to the request signal sent from the in-vehicle device 1 by returning a response signal containing the ID code.

At S13 it is determined whether the receiver 3 received the response signal. When having received (S13: YES), at S14, the ID code contained in response signals is collated with the ID code 12*b* stored in the ROM 12 (or flash memory or EEPROM). When the collation is successfully or affirmatively made, i.e., when the ID code contained in response signals accords with the ID code 12*b* stored in the ROM 12 (S15: YES), it is considered that an assistant is present in the assistance-possible area. At S16, the movement mode of the welfare-use seat device 60 is switched into the "short-depression movement mode." Furthermore, S11 to S15 by the control circuit 10 may be referred to as a determination means or section to determine whether the portable key device 2 or portable device is in the assistance-possible area. Furthermore, S16 or S17 by the control circuit 10 may be referred to as a movement mode designation means or section to designate a movement mode.

In contrast, when the response signal cannot be received (S13: NO), or when the collation is unsuccessfully or negatively made, i.e., when the ID code contained in response signals does not accord with the ID code 12*b* stored in the ROM 12 (S15: YES), it is considered that any assistant is not present in the assistance-possible area. At S17, the movement mode of the welfare-use seat device 60 is switched into the "the long-depression movement mode."

At S18, the indicator 70 indicates the designated movement mode of the welfare-use seat device 60. For example, when the "short-depression movement mode" is designated, the buzzer is sounded once. In contrast, when the "long-depression movement mode" is designated, the buzzer is sounded twice. This allows the user to understand in which movement mode the welfare-use seat device 60 is to operate. For example, the user can grasp whether to carry out the short-time manipulation or depression to manipulate the operation instruction switch 25*d* only for a short time or long-time manipulation or depression to manipulate the operation instruction switch 25*d* for a continued long time. Then, the movement mode designation process in FIG. 6 is ended. Furthermore, S18 may be referred to as a movement mode indication means or section.

Figure 7:
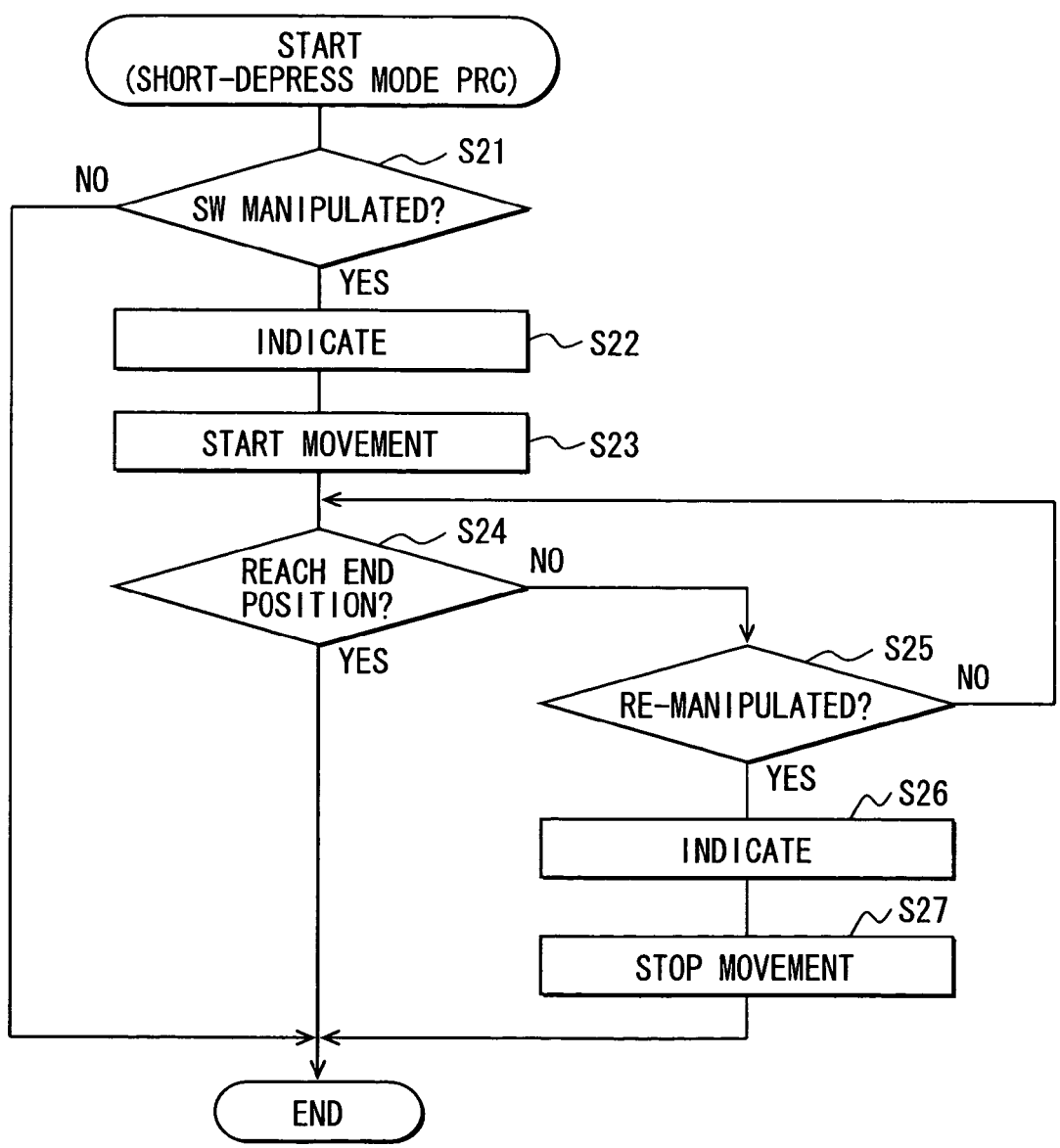
FIG. 7 is a flowchart illustrating a short-depression movement mode process.
Figure 8:
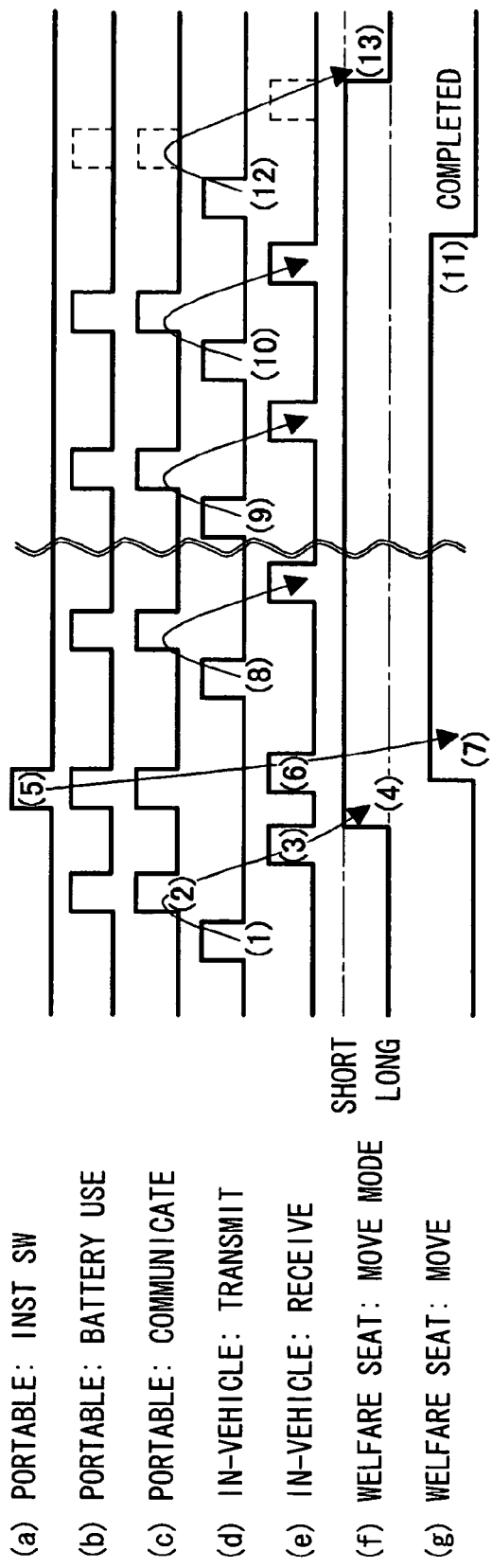
FIG. 8 is a diagram for illustrating a timing chart of signals in "short-depression movement mode"

The in-vehicle device 1 can control or execute the movement of the welfare-use seat device 60 according to the movement mode designated in the movement mode designation process. FIG. 7 is a flowchart which illustrates the short-depression movement mode process of the welfare-use seat device 60 in the "short-depression movement mode" which the collation ECU 10 (i.e., the control circuit 10) executes. FIG. 8 is a timing chart of signals in "short-depression movement mode," i.e., when "short-depression movement mode" continues to be maintained. Hereinafter, the "short-depression movement mode" is explained with reference to FIG. 7 and FIG. 8. Furthermore, the short-depression movement mode process of FIG. 7 is executed with predetermined regular intervals under the condition that the "short-depression movement mode" is designated, i.e., continues being designated. In other words, the short-depression movement mode process of FIG. 7 can be executed when the ID code contained in response signals accords with the ID code 12*b* stored in the ROM 12 (S15: YES) and thereby it is confirmed that an assistant is present in the assistance-possible area.

First, at S21, it is determined whether the short-time manipulation or depression is applied to the operation instruction switch 25*d* of the wireless portable key device 2, based on whether the receiver 3 of the in-vehicle device 1 receives an operation signal of the operation instruction switch 25*d*. When the operation instruction switch 25*d* is not manipulated (S21: NO), the short-depression movement mode process in FIG. 7 is ended as it is.

In contrast, when the operation instruction switch 25*d* is manipulated (S21: YES), at S22, it is reported that the movement of the welfare-use seat device 60 is to be started, for instance, by sounding the buzzer via the indicator 70 etc. This allows the user to understand that the movement of the welfare-use seat device 60 is going to start. For example, the preparation for the start of the movement of the welfare-use seat device 60 can be made.

At S23, the seat control ECU 61 is instructed to operate the welfare-use seat device 60. The movement of the welfare-use seat device 60 is thereby started.

At S24, it is determined whether the welfare-use seat device 60 reaches a movement end position by asking the seat control ECU 61. When not reaching the movement end position (S24: NO), it is determined whether the operation instruction switch 25*d* of the wireless portable key device 2 is re-manipulated at S25. When not re-manipulated (S25: NO), the processing returns to S24. When the welfare-use seat device 60 reaches the movement end position (S24: YES), the short-depression movement mode process in FIG. 7 is ended as it is.

In contrast, when the operation instruction switch 25*d* is re-manipulated in course of the movement of the welfare-use seat device 60 (S25: YES), at S26, it is reported that the movement of the welfare-use seat device 60 is to be stopped, for instance, by sounding the buzzer via the indicator 70 etc. This allows the user to understand that the movement of the welfare-use seat device 60 is going to stop. For example, the preparation for the stop of the movement of the welfare-use seat device 60 can be made. At S27, the seat control ECU 61 is instructed to stop the movement of the welfare-use seat device 60. Thus, the movement of the welfare-use seat device 60 is stopped. Then, the short-depression movement mode process in FIG. 7 is ended. Furthermore, S21 to S27 by the control circuit 10 may be referred to as an execution means or section. Furthermore, S22 and S26 may be referred to as a movement start indication means or section and a movement stop indication means or section, respectively.

With reference to the timing chart of FIG. 8, the operation timing of the various signals and various elements is explained. FIG. 8 illustrates as follows: (a) Timing chart which indicates a manipulation timing of the operation instruction switch 25*d* of the wireless portable key device 2; (b) Timing chart which indicates a use timing of the battery 21 of the wireless portable key device 2; (c) Timing chart which indicates a communications timing of the wireless portable key device 2; (d) Timing chart which indicates a transmission timing of a request signal from the vehicle-outside passenger seat transmitter 6*a*; (e) Timing chart which indicates a receiving timing when the signal is received by the receiver 3 of the in-vehicle device 1; (f) Timing chart which indicates a change timing of the movement mode; and (g) Timing chart which indicates a movement timing of the welfare-use seat device 60.

The in-vehicle device 1 sends the request signal to the assistance-possible area (FIG. 8, (*d*), (1)). When the user who carries the wireless portable key device 2 is in the assistance-possible area, the wireless portable key device 2 responds to the request signal by returning the response signal (FIG. 8, (*c*), (2)). When receiving the response signal (FIG. 8, (*e*), (3)), the in-vehicle device 1 designates the "short-depression movement mode" (FIG. 8, (*f*), (4)). Then, when the operation instruction switch 25*d* of the wireless portable key device 2 is manipulated (FIG. 8, (*a*), (5)), the in-vehicle device 1 receives the operation signal (FIG. 8, (*e*), (6)) to thereby move the welfare-use seat device 60 up to the movement end position (FIG. 8, (*g*), (7) to (11)).

In addition, in the state or condition of the "short-depression movement mode," the in-vehicle device 1 sends request signals periodically, and determines whether the wireless portable key device 2 exists (i.e., continues to exist) in the assistance-possible area (FIG. 8, (*d*), (8), (9), (10), (12)). When the wireless portable key device 2 does not exist in the assistance-possible area, the movement mode is changed to "long-depression movement mode" (FIG. 8, (*f*), (13)).

In addition, the battery 21 of the wireless portable key device 2 is used or discharged when the response signal is transmitted and when the operation signal is transmitted from the operation instruction switch 25*d* to the in-vehicle device 1. Thus, the battery 21 is not always used while the welfare-use seat device 60 operates or moves (FIG. 8, (*b*)).

Thus, when the user who carries the wireless portable key device 2 is in the assistance-possible area, the "short-depression movement mode" is designated. In the "short-depression movement mode," the welfare-use seat device 60 is moved to the movement end position based on a short-time manipulation or depression to the operation instruction switch 25*d* of the wireless portable key device 2. In other words, the short-time manipulation functions as a trigger signal to start the movement of the welfare-use seat device 60 up to the movement end position. Therefore, the user's manipulation load can be reduced and deterioration of the battery life of the wireless portable key device 2 can be reduced. It is noted that the wireless portable key device 2 exists in the assistance-possible area; thus, it is considered that the user who carries the wireless portable key device 2 is also in the assistance-possible area. Therefore, even if a failure occurs in course of the movement of the welfare-use seat device 60, the user of the wireless portable key device 2 can assist the user of the welfare-use seat device 60, for instance, by urgently stopping the movement of the welfare-use seat device 60 or supporting the user of the welfare-use seat device 60, thus allowing the safety to be maintained.

In addition, in the "short-depression movement mode," the movement of the welfare-use seat device 60 is stopped when the operation instruction switch 25*d* is re-manipulated in course of (i.e., during) the movement of the welfare-use seat device 60. Therefore, even if a failure occurs in the middle of the movement of the welfare-use seat device 60, the user of the wireless portable key device 2 can stop the movement of the welfare-use seat device 60 promptly and easily.

Figure 9:
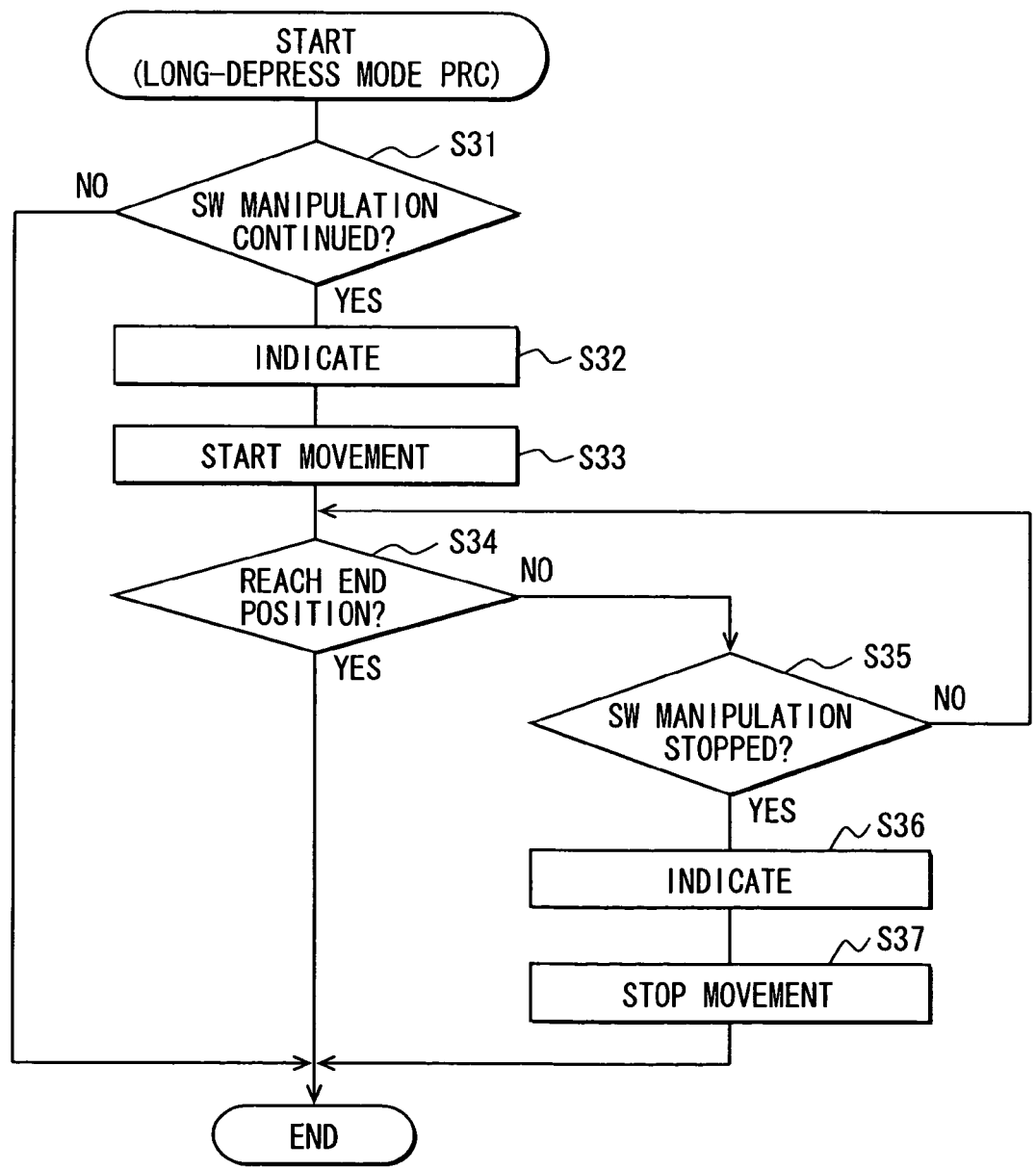
FIG. 9 is a flowchart illustrating a long-depression movement mode process.

Next, the "long-depression movement mode" is explained with reference to FIG. 9 and FIG. 10. FIG. 9 is a flowchart which indicates the long-depression movement mode process of the welfare-use seat device 60 in the "long-depression movement mode" which the collation ECU 10 (i.e., the control circuit 10) executes. FIG. 10 is a diagram for illustrating a timing chart of signals in "long-depression movement mode." Furthermore, the long-depression movement mode process of FIG. 9 is executed with predetermined regular intervals under the state or condition that the "long-depression movement mode" is designated.

First, at S31, it is determined whether the operation instruction switch 25*d* of the wireless portable key device 2 is manipulated and such a manipulation (i.e., depression) to the operation instruction switch 25*d* is still continued, based on whether the receiver 3 receives the operation signal of the operation instruction switch 25*d*. When the manipulation to the operation instruction switch 25*d* is not continued (S31: NO), the long-depression movement mode process in FIG. 9 is ended as it is.

In contrast, when the manipulation to the operation instruction switch 25*d* is continued (S31: YES), at S32, it is reported that the movement of the welfare-use seat device 60 is to be started, for instance, by sounding the buzzer with the indicator 70 etc. This allows the user to understand that the movement of the welfare-use seat device 60 is going to start. For example, the preparation for the start of the movement of the welfare-use seat device 60 can be made.

At S33, the seat control ECU 61 is instructed to operate or move the welfare-use seat device 60. Thus, the movement of the welfare-use seat device 60 is started.

At S34, it is determined whether the welfare-use seat device 60 reaches a movement end position by asking the seat control ECU 61. When not reaching the movement end position (S34: NO), it is determined whether the manipulation or depression to the operation instruction switch 25*d* of the wireless portable key device 2 is stopped at S35. When not stopped (S35: NO), the processing returns to S34. When the welfare-use seat device 60 reaches the movement end position (S34: YES), the long-depression movement mode process in FIG. 9 is ended as it is.

In contrast, when the manipulation to the operation instruction switch 25*d* is stopped in course of the movement of the welfare-use seat device 60 (S35: YES), it is reported at S36 that the movement of the welfare-use seat device 60 is to be stopped, for instance, by sounding the buzzer with the indicator 70 etc. This allows the user to understand that the movement of the welfare-use seat device 60 is going to stop. For example, the preparation for the stop of the movement of the welfare-use seat device 60 can be made. At S37, the seat control ECU 61 is instructed to stop the movement of the welfare-use seat device 60. Thus, the movement of the welfare-use seat device 60 is stopped. Then, the long-depression movement mode process in FIG. 9 is ended. Furthermore, S31 to S37 by the control circuit 10 may be referred to as an execution means or section. Furthermore, S32 and S36 by the control circuit 10 may be referred to as a movement start indication means or section and a movement stop indication means or section, respectively.

With reference to the timing chart of FIG. 10, the timing of the various signals and various elements is explained. FIG. 10 indicates the timing chart of the same kind of, timing chart ((a)-(g)) of FIG. 8.

The in-vehicle device 1 sends the request signal to the assistance-possible area (FIG. 10, (*d*), (1)). When the user who carries the wireless portable key device 2 is not in the assistance-possible area, the in-vehicle device 1 designates the "long-depression movement mode" (FIG. 10, (*f*)). Then, when the operation instruction switch 25*d* of the wireless portable key device 2 is manipulated (FIG. 10, (*a*), (2)), the in-vehicle device 1 starts the movement of the welfare-use seat device 60 (FIG. 10, (*g*), (4)). The movement is executed only while the operation instruction switch 25*d* is being manipulated. When the manipulation of the operation instruction switch 25d is stopped (FIG. 10, (a), (5)), the in-vehicle device 1 stops the movement of the welfare-use seat device 60 (FIG. 10, (g), (7)).

In addition, the battery 21 of the wireless portable key device 2 is used only while the operation signal from the operation instruction switch 25d is transmitted to the in-vehicle device 1 (FIG. 10, (c), (3) to (6)).

Thus, when the user who carries the wireless portable key device 2 is not in the assistance-possible area, the "long-depression movement mode" is designated. In the "long-depression movement mode," the welfare-use seat device 60 is operated only while the operation instruction switch 25d is being manipulated. That is, the welfare-use seat device 60 is operated only while the positive intention of operating the welfare-use seat device 60 is indicated. Therefore, even if the wireless portable key device 2 hits something to thereby cause a short-time manipulation, the movement is not continued, thus allowing the safety to be maintained.

As explained above, in the vehicular device control system of the present embodiment, either the "short-depression movement mode" or the "long-depression movement mode" is designated depending on whether the wireless portable key device 2 exists in the assistance-possible area. When the wireless portable key device 2 moves out of the assistance-possible area after the "short-depression movement mode" is designated, the movement mode is switched into the "long-depression movement mode." FIG. 11 is a diagram for illustrating a timing chart of signals and elements when the wireless portable key device 2, which was inside of the assistance-possible area, is then moved outside of the assistance-possible area. FIG. 11 indicates the timing chart of the same kind of timing chart ((a)-(g)) of FIG. 8.

The in-vehicle device 1 sends the request signal to the assistance-possible area (FIG. 11, (d), (1)). When the user who carries the wireless portable key device 2 is present in the assistance-possible area, the wireless portable key device 2 responds to the request signal by returning a response signal (FIG. 11, (c), (2)). When, receiving the response signal (FIG. 11, (e), (3)), the in-vehicle device 1 designates the "short-depression movement mode" (FIG. 11, (f), (4)). Then, when the operation instruction switch 25d of the wireless portable key device 2 is manipulated (FIG. 11, (a), (5)), the in-vehicle device 1 receives the operation signal (FIG. 11, (e), (6)), and the in-vehicle device 1 starts the movement of the welfare-use seat device 60 (FIG. 11, (g), (7)).

In addition, in the state of the "short-depression movement mode," the in-vehicle device 1 sends request signals periodically, and determines whether the wireless portable key device 2 exists or continues to exist in the assistance-possible area (FIG. 11, (d), (8), (9)). In course of the movement of the welfare-use seat device 60, when the wireless portable key device 2 moves out of the assistance-possible area (FIG. 11 (d), (9)), the movement mode is changed to "long-depression movement mode" (FIG. 11, (f), (10)). The in-vehicle device 1 stops the movement of the welfare-use seat device 60 (FIG. 11, (g), (11)).

Then, only while the operation instruction switch 25d of the wireless portable key device 2 is being manipulated (FIG. 11, (a), (12) to (15)), the welfare-use seat device 60 is operated (FIG. 11, (g), (14) to (17)).

In addition, in the "short-depression movement mode," the battery 21 of the wireless portable key device 2 is used or discharged at the timing when the response signal or the operation signal from the operation instruction switch 25d is transmitted to the in-vehicle device 1 (FIG. 11, (b)). In the "long-depression movement mode," the battery 21 is used while the welfare-use seat device 60 is operated (FIG. 11, (b), (13) to (16)).

Thus, when the wireless portable key device 2 moves out of the assistance-possible area, there is a possibility that an assistant, who assists the user of the welfare-use seat device 60, is not in the assistance-possible area. In such a case, even in the middle of the movement of the welfare-use seat device 60, the movement mode is changed to the "long-depression movement mode," thereby considering the safety aspect. It is noted that the movement mode is changed from the "short-depression movement mode" to the "long-depression movement mode" under the movement mode designation process in FIG. 6, which is explained previously. In such a case, changing to the "long-depression movement mode" is notified or indicated at S18 in FIG. 6; thus, the user can understand that the movement mode has changed.

In contrast, even if the wireless portable key device 2 is moved into an inside of the assistance-possible area in the middle of the movement of the welfare-use seat device 60 under the "long-depression movement mode," the "long-depression movement mode" is maintained. FIG. 12 is a diagram for illustrating a timing chart of signals and elements when a wireless portable key device 2, which is outside of the assistance-possible area, is then moved inside of the assistance-possible area. FIG. 12 indicates the timing chart of the same kind of timing chart ((a)-(g)) of FIG. 8.

The in-vehicle device 1 sends the request signal to the assistance-possible area (FIG. 12, (d), (1)). When the user who carries the wireless portable key device 2 is not in the assistance-possible area, the in-vehicle device 1 designates the "long-depression movement mode" (FIG. 12, (f)). Then, when the manipulation to the operation instruction switch 25d of the wireless portable key device 2 is started (FIG. 12, (a), (2)), the in-vehicle device 1 starts the movement of the welfare-use seat device 60 (FIG. 12, (g), (3)).

Then, in course of the movement of the welfare-use seat device 60, even if the wireless portable key device 2 moves to inside of the assistance-possible area, the "long-depression movement mode" is maintained (FIG. 12, (f)). Therefore, the welfare-use seat device 60 is operated only while the operation instruction switch 25d is being actually manipulated (FIG. 12, (a), (g)).

In addition, the battery 21 of the wireless portable key device 2 is used only while the operation signal from the operation instruction switch 25d is transmitted to the in-vehicle device 1 (FIG. 12, (b)).

Such a configuration is achieved from the following reason, for instance. It is assumed that the long-depression movement mode is changed to the short-depression movement mode when the wireless portable key device 2 is moved into an inside of the assistance-possible area in the middle of the movement of the welfare-use seat device 60 under the "long-depression movement mode." In such a case, the user may be unable to respond to the operating method or instruction of the "short-depression movement mode" promptly. To that end, in such a case, the "long-depression movement mode" is maintained in consideration of the safety aspect.

According to the vehicular device control system of the present embodiment, the welfare-use seat device 60 is operated by the short-time manipulation to the operation instruction switch 25d when the wireless portable key device 2 exists in the assistance-possible area. Therefore, the user's manipulation load can be reduced and deterioration of the battery life of the wireless portable key device 2 can be reduced. Since the wireless portable key device 2 exists in the assistance-possible area, it is thought that the user, who carries the wireless portable key device 2, is also in the assistance-possible area. Therefore, even if a failure occurs in the course of the movement of the welfare-use seat device 60, the user of the wireless portable key device 2 can assist the user of the welfare-use seat device 60, for instance, by urgently stopping the movement of the welfare-use seat device 60 or supporting the user of the welfare-use seat device 60, thus maintaining the safety.

Furthermore, the vehicular device control system of the present embodiment is not limited to the above embodiment, but can be modified in various manners within a scope thereof. For example, other than the welfare seat device, the present invention can be directed to a welfare-use device which assists a user under the condition that a third person is present near the user of the welfare-use device.

Each or any combination of processes, functions, sections, steps, or means explained in the above can be achieved as a software section or unit (e.g., subroutine) and/or a hardware section or unit (e.g., circuit or integrated circuit), including or not including a function of a related device; furthermore, the hardware section or unit can be constructed inside of a microcomputer.

Furthermore, the software section or unit or any combinations of multiple software sections or units can be included in a software program, which can be contained in a computer-readable storage media or can be downloaded and installed in a computer via a communications network.

Aspects of the disclosure described herein are set out in the following clauses.

As an aspect of the disclosure, a vehicular device control system is provided as follows. A vehicular device is provided in a vehicle. A portable device carried by a user of the vehicle is provided while having a function of wireless intercommunication. An in-vehicle device is provided in the vehicle and configured to execute the wireless intercommunication with the portable device. The portable device is further configured to comprise an operation instruction switch which issues, by the wireless intercommunication, to the in-vehicle device an operation instruction of operating the vehicular device. The in-vehicle device is further configured to comprise (i) a determination section to determine, by the wireless intercommunication with the portable device, whether the portable device exists in an assistance-possible area, which is in a vicinity of the vehicular device, the assistance-possible area in which a user of the vehicular device is able to assisted; (ii) a movement mode designation section to designate a short-manipulation movement mode when it is determined that the portable device exists in the assistance-possible area; and (iii) an execution section to execute a movement of the vehicular device such that while the short-manipulation movement mode continues to be designated by the movement mode designation section, the vehicular device is moved up to a movement end position by a short-time manipulation, which is applied to the operation instruction switch.

As an optional aspect of the disclosure, the portable device may be further configured to respond to a request signal by transmitting a response signal. The determination section may be further configured to transmit the request signal in the assistance-possible area, and determine whether the portable device exists in the assistance-possible area based on the response signal which responds to the request signal.

Thus, it can be determined whether the portable device exists in the assistance-possible area.

As an optional aspect of the disclosure, the execution section may be further configured to stop the movement of the vehicular device when an other manipulation other than the short-time manipulation is applied to the operation instruction switch in course of the movement up to the movement end position of the vehicular device based on the short-time manipulation under the short-manipulation movement mode.

Thus, it can be designed that the movement of the vehicular device is stopped by the portable device. Stopping the movement of the vehicular device can be easily achieved.

As an optional aspect of the disclosure, the movement mode designation section may be further configured to designate a long-manipulation movement mode when it is determined that the portable device does not exist in the assistance-possible area. The execution section may be further configured to execute the movement of the vehicular device such that under the long-manipulation movement mode designated by the movement mode designation section, only while a manipulation is being applied to the operation instruction switch, the vehicular device is moved.

When the portable device does not exist in the assistance-possible area, there is a possibility that an assistant, who assists the user of the vehicular device, is not in the assistance-possible area. Therefore, when a failure occurs in course of the movement of the vehicular device, the occurring failure may be unable to be coped with immediately. To that end, when the portable device does not exist in the assistance-possible area, the vehicular device is operated under the long-depression movement mode in consideration of the safety aspect. Thereby, the safety is maintainable even when the portable device does not exist in the assistance-possible area.

As an optional aspect of the disclosure, a movement mode indication device may be configured to indicate whichever of the short-manipulation movement mode or the long-manipulation movement mode the movement mode designation section designates presently.

This enables the user to understand which movement mode the vehicular device is to be operated. For example, the user can understand easily whether to carry out the short-time manipulation to the operation instruction switch or the long-time continued manipulation to the operation instruction switch.

As an optional aspect of the disclosure, a movement start indication device may be configured to indicate a start of the movement of the vehicular device.

This allows the user to understand that the movement of the vehicular device is going to start. For example, the preparation for the start of the movement of the vehicular device can be made.

As an optional aspect of the disclosure, a movement stop indication device may be configured to indicate a stop of the movement of the vehicular device before reaching the movement end position.

This allows the user to understand that the movement of the vehicular device is going to stop before reaching the movement end position. For example, the preparation for the stop of the movement of the vehicular device before reaching the movement end position can be made.

As an optional aspect of the disclosure, the movement mode designation section may be further configured to continue to designate the long-manipulation movement mode even when the portable device moves into the assistance-possible area in course of the movement of the vehicular device under the long-manipulation movement mode.

For instance, it can be designed that the long-depression movement mode is changed into the short-depression movement mode when the portable device moves into the assistance-possible area while the vehicular device is in course of the movement under the long-depression movement mode. In such a case, the user may be unable to respond to the operation instruction of the short-depression movement mode promptly. Then, in such a case, the long-depression movement mode is maintained as it is in consideration of the safety aspect.

As an optional aspect of the disclosure, the vehicular device is a welfare-use, device to assist a user of the welfare-use device in a condition that a third person is present in a vicinity of the user of the welfare device.

Such a welfare-use device may be typically used for an aged person or disabled person; thus, attention should be paid to the safety aspect among others. It is suitable to apply the present vehicular device control system to a control system for the welfare-use device.

As an optional aspect of the disclosure, the welfare-use device may be a welfare-use seat device which executes movement inward and outward of the vehicle.

It will be obvious to those skilled in the art that various changes may be made in the above-described embodiments of the present invention. However, the scope of the present invention should be determined by the following claims.

What is claimed:

1. A vehicular driver chair control system comprising:
   a vehicular driver chair provided in a vehicle;
   a portable device carried by a user of the vehicle and capable of wireless intercommunication; and
   an in-vehicle device provided in the vehicle and configured to execute the wireless intercommunication with the portable device,
   the portable device being further configured to comprise an operation instruction switch which issues, by the wireless intercommunication, to the in-vehicle device an operation instruction of operating the vehicular device,
   the in-vehicle device being further configured to comprise
      a determination section to determine, by the wireless intercommunication with the portable device, whether the portable device exists in an assistance-possible area, which is in a vicinity of the vehicular driver chair, the assistance-possible area in which a user of the vehicular driver chair is able to assisted;
      a movement mode designation section to designate a short-manipulation movement mode when it is determined that the portable device exists in the assistance-possible area; and
      an execution section to execute a movement of the vehicular driver chair such that while the short-manipulation movement mode continues to be designated by the movement mode designation section, the vehicular device is moved up to a movement end position by a short-time manipulation, which is applied to the operation instruction switch.

2. The vehicular device control system according to claim 1,
   the portable device being further configured to respond to a request signal by transmitting a response signal,
   the determination section being further configured to transmit the request signal in the assistance-possible area, and
   determine whether the portable device exists in the assistance-possible area based on the response signal which responds to the request signal.

3. The vehicular device control system according to claim 1,
   the execution section being further configured to stop the movement of the vehicular device when an other manipulation other than the short-time manipulation is applied to the operation instruction switch in course of the movement up to the movement end position of the vehicular device based on the short-time manipulation under the short-manipulation movement mode.

4. The vehicular device control system according to claim 1,
   the movement mode designation section being further configured to designate a long-manipulation movement mode when it is determined that the portable device does not exist in the assistance-possible area,
   the execution section being further configured to execute the movement of the vehicular device such that under the long-manipulation movement mode designated by the movement mode designation section, only while a manipulation is being applied to the operation instruction switch, the vehicular device is moved.

5. The vehicular device control system according to claim 4, further comprising:
   a movement mode indication device configured to indicate whichever of the short-manipulation movement mode or the long-manipulation movement mode the movement mode designation section designates presently.

6. The vehicular device control system according to claim 4, further comprising:
   a movement start indication device configured to indicate a start of the movement of the vehicular device.

7. The vehicular device control system according to claim 4, further comprising: a movement stop indication device configured to indicate a stop of the movement of the vehicular device before reaching the movement end position.

8. The vehicular device control system according to claim 4,
   the movement mode designation section being further configured to continue to designate the long-manipulation movement mode even when the portable device moves into the assistance-possible area in course of the movement of the vehicular device under the long-manipulation movement mode.

9. The vehicular device control system according to claim 1, wherein
   the vehicular device is a welfare-use device to assist a user of the welfare-use device in a condition that a third person is present in a vicinity of the user of the welfare device.

10. The vehicular device control system according to claim 9, wherein
    the welfare-use device is a welfare-use seat device which executes movement inward and outward of the vehicle.

11. A vehicular driver chair control system comprising:
    a vehicular driver chair provided in a vehicle;
    an in-vehicle device provided in the vehicle and configured to control the vehicular driver chair, the in-vehicle device having a function of wireless intercommunication; and
    a portable device carried by a user of the vehicle and configured to execute the wireless intercommunication with the in-vehicle device, the portable device comprising an operation instruction switch which issues, via the wireless intercommunication, to the in-vehicle device an operation instruction of operating the vehicular driver chair,
    the in-vehicle device being further configured to comprise:
       a determination section to determine, using the wireless intercommunication with the portable device, whether the portable device exists in an assistance-possible area, which is in a vicinity of the welfare-use device, the assistance-possible area in which a user of the vehicular driver chair is able to be assisted by the user carrying the portable device;

a movement mode designation section to designate a short-manipulation movement mode when it is determined that the portable device exists in the assistance-possible area; and an execution section to execute a movement of the welfare-use device such that the movement of the vehicular driver chair is started by a trigger signal corresponding to a short-time manipulation, which is applied to the operation instruction switch of the portable device under the short-manipulation movement mode being designated, and the movement of the vehicular driver chair is continued until reaching a movement end position as long as the movement mode designation section subsequently continues to designate the short-manipulation movement mode.

12. A method for moving a vehicular driver chair in a vehicular service device control system including:

an in-vehicle device provided in the vehicle and configured to control the vehicular driver chair, the in-vehicle device having a function of wireless intercommunication; and a portable device carried by a user of the vehicle and configured to execute the wireless intercommunication with the in-vehicle device, the portable device comprising an operation instruction switch which issues, via the wireless intercommunication, to the in-vehicle device an operation instruction of operating the vehicular driver chair, the method comprising:

determining, using the wireless intercommunication with the portable device, whether the portable device exists in an assistance-possible area, which is in a vicinity of the vehicular driver chair, the assistance-possible area in which a user of the vehicular driver chair is able to be assisted by the user carrying the portable device;

designating a short-manipulation movement mode when it is determined that the portable device exists in the assistance-possible area;

determining whether, under the short-manipulation movement mode, a short-time manipulation is applied to the operation instruction switch of the portable device;

starting, when it is determined that the short-time manipulation is applied to the operation instruction switch under the short-manipulation movement mode, a movement of the vehicular driver chair toward a movement end position; and then continuing the movement of the vehicular driver chair until reaching the movement end position as long as the short-manipulation movement mode continues being designated.

\* \* \* \* \*